United States Patent
Zhou et al.

(10) Patent No.: US 9,745,480 B2
(45) Date of Patent: Aug. 29, 2017

(54) METHOD FOR PRODUCING BITUMINOUS COATINGS WITH REDUCED TACKINESS

(71) Applicant: Akzo Nobel Chemicals International B.V., Arnhem (NL)

(72) Inventors: Qiong Zhou, Hopewell Junction, NY (US); Alan Duncan James, Chicago, IL (US); Ralph Franklin, Danbury, CT (US); Christine Cornelia Gorsuch, Wappinger Falls, NY (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/310,663

(22) PCT Filed: Jun. 11, 2015

(86) PCT No.: PCT/EP2015/063030
§ 371 (c)(1),
(2) Date: Nov. 11, 2016

(87) PCT Pub. No.: WO2015/189322
PCT Pub. Date: Dec. 17, 2015

(65) Prior Publication Data
US 2017/0073531 A1    Mar. 16, 2017

Related U.S. Application Data

(60) Provisional application No. 62/011,271, filed on Jun. 12, 2014.

(30) Foreign Application Priority Data

Sep. 24, 2014  (EP) .................................. 14186173

(51) Int. Cl.
| | |
|---|---|
| *E01C 7/00* | (2006.01) |
| *C09D 7/12* | (2006.01) |
| *E01C 7/32* | (2006.01) |
| *E01C 7/35* | (2006.01) |
| *C08L 95/00* | (2006.01) |
| *B05D 3/10* | (2006.01) |
| *B05D 5/08* | (2006.01) |
| *B05D 7/24* | (2006.01) |
| *C09D 195/00* | (2006.01) |
| *E01C 7/18* | (2006.01) |

(52) U.S. Cl.
CPC ............ *C09D 7/125* (2013.01); *B05D 3/107* (2013.01); *B05D 5/08* (2013.01); *B05D 7/24* (2013.01); *C08L 95/00* (2013.01); *C09D 195/005* (2013.01); *E01C 7/185* (2013.01); *E01C 7/32* (2013.01); *E01C 7/325* (2013.01); *E01C 7/35* (2013.01); *E01C 7/353* (2013.01)

(58) Field of Classification Search
CPC .... C09D 7/125; C09D 195/005; B05D 3/107; B05D 7/24; B05D 5/08; E01C 7/325; E01C 7/353

USPC ... 404/17, 18–20, 27, 28, 31, 72, 74–76, 82, 404/93–95, 108, 111
See application file for complete search history.

(56) References Cited

U.S. PATENT DOCUMENTS

| | | | |
|---|---|---|---|
| 2,287,849 A | 6/1942 | Wilson | |
| 2,464,759 A | 3/1949 | Camp | |
| 3,813,280 A | 5/1974 | Olszyk et al. | |
| 4,113,401 A * | 9/1978 | McDonald | E01C 7/187 404/75 |
| 4,256,734 A | 3/1981 | Smadja | |
| 4,447,500 A | 5/1984 | Ferris | |
| 5,513,925 A * | 5/1996 | Dempsey | B32B 7/02 404/17 |
| 5,763,012 A | 6/1998 | Zhao et al. | |
| 5,893,679 A | 4/1999 | Durand et al. | |
| 6,025,016 A | 2/2000 | Serfass et al. | |
| 6,158,920 A * | 12/2000 | Malot | E01C 11/005 404/27 |
| 6,454,489 B1 * | 9/2002 | Murata | C04B 14/305 404/17 |
| 6,528,581 B1 | 3/2003 | Kelly et al. | |
| 7,160,379 B1 | 1/2007 | Shoshany et al. | |
| 7,503,724 B2 | 3/2009 | Blacklidge | |
| 8,061,931 B2 | 11/2011 | Musil | |
| 8,158,696 B2 | 4/2012 | Guzman et al. | |
| 2004/0102547 A1 | 5/2004 | Cowley et al. | |
| 2005/0209376 A1 | 9/2005 | Donelson et al. | |
| 2007/0141241 A1* | 6/2007 | Blacklidge | C08L 95/005 427/138 |

(Continued)

FOREIGN PATENT DOCUMENTS

| | | |
|---|---|---|
| EP | 0414423 A1 | 2/1991 |
| EP | 0829579 A1 | 3/1998 |

(Continued)

OTHER PUBLICATIONS

European Search Report for EP14186173.2 dated Mar. 24, 2015.
International Search Report and Written Opinion for PCT/EP2015/063030 dated Aug. 24, 2015.
Christine Gorsuch et al., Measuring Surface Tackiness of Modified Asphalt Binders and Emulsion Residues using a Dynamic Shear Rheometer (DSR), 2012 International Symposium on Asphalt Emulsion Technology.

*Primary Examiner* — Raymond W Addie
(74) *Attorney, Agent, or Firm* — Matthew J. DeRuyter

(57) ABSTRACT

A method renders the surface of bitumen materials to be non-tacky, and minimize or eliminate the loss of the bitumen materials to traffic. The method may also be used on top of prime coat and fog seal, to reduce tackiness of bitumen materials from cured bitumen emulsions, and to decrease unnecessary and unwanted tracking by passing traffic.

14 Claims, 7 Drawing Sheets

(56) References Cited

U.S. PATENT DOCUMENTS

| | | |
|---|---|---|
| 2012/0063843 A1 | 3/2012 | Blacklidge |
| 2013/0036714 A1 | 2/2013 | Bolton et al. |
| 2013/0045048 A1* | 2/2013 | Campbell ............ C09J 195/005 |
| | | 404/17 |
| 2014/0112717 A1* | 4/2014 | Yu .......................... E01C 11/16 |
| | | 404/72 |

FOREIGN PATENT DOCUMENTS

| | | |
|---|---|---|
| FR | 2025771 | 9/1970 |
| WO | 2014/139999 A1 | 9/2014 |

\* cited by examiner

METHOD FOR PRODUCING BITUMINOUS COATINGS WITH REDUCED TACKINESS

This application is a national stage filing under 35 U.S.C. §371 of PCT/EP2015/063030, filed Jun. 11, 2015, which claims priority to U.S. Provisional Patent Application No. 62/011,271 filed Jun. 12, 2014, and European Patent Application No. 14186173.2, filed Sep. 24, 2014, the contents of which are each incorporated herein by reference in their entireties.

FIELD OF THE INVENTION

The present invention relates to a method of making bitumen coatings with reduced tackiness and reduced tracking on various substrates.

BACKGROUND OF THE INVENTION

Bitumen based materials which include hot bitumen binders, the residues obtained from cut back bitumen, and bitumen emulsions are widely used in road and building constructions and coatings. The strong adhesion and film formation properties make them ideal materials for pavement building, repairing, maintenance and preservation, protective coatings, and water proofing coatings. For example, tack coats by hot applied asphalt binder or spray (cold or warm) applied asphalt emulsion is often used to provide a thin adhesive film of asphalt between the existing pavement and a new surface layer. The formed tack or bond coats reduce the risk of slippage between the two layers. Good contact without slippage allows the stress in the pavement to be uniformly distributed. Bituminous materials are also widely used in fog seal, primes, crack filling, and sealing. Fog seal is a light spray application of asphalt emulsion primarily onto existing asphalt surfaces to seal minor cracks, reduce raveling, and enrich dry and worn out pavements. Prime coats of conventional asphalt emulsion can be used to provide a water resistant membrane of asphalt to seal road bases, sub-bases and sub-grades and to prevent ingress of water or water loss by surface evaporation, to control dust, and to provide a good surface for subsequent paving or sealing operations. Prime coats also ensure good bonding of a bituminous overlay. Protective coatings based on bituminous materials are applied to metal castings or pipework. Waterproofing coatings are applied to building envelope, water retention ponds, pipes, etc.

One drawback of bitumen based materials is that they are tacky and have a tendency to transfer to surfaces that come in contact with them. For example, bitumen applied to a roadway may be picked up by the tires of passing traffic or construction equipment, especially at elevated temperatures. For tack coat applications, when pick up occurs, it can damage the bituminous film and hence reduce the bond between the layers. Bitumen picked up by the tires would then be deposited ("tracked") on adjacent roads which could cause safety issues and increase clean-up costs to paving contractors. In the case of bitumen coated metal goods, they may stick to each other during storage or handling leading to damage to the coating.

It is known that very hard bitumen materials with high softening point are much less sticky. Non-tracking tack coats have been developed to minimize pick up of the binder by the tires of traffic or construction vehicles. These trackless tack coats are prepared from hard asphalt binder, generally with a softening point above 65° C. and a penetration less than 40 dmm, and applied as hot liquid or in emulsion form. The bitumen materials could be low penetration asphalts available from the refining of crude oil, oxidized bitumen and blends of these materials with softer bitumen (>40 pen), or produced by blending softer grade bitumen with modifiers such as Gilsonite, polymers, high melting point waxes, or minerals. Alternatively, emulsions of soft bitumen could be blended with water dispersions or emulsions of the modifiers, and when the emulsion mixture dries the resulting residue has the desired non tacky, non-tracking properties. Similar modifications to asphalt binders and asphalt emulsions discussed above are also utilized to make non-tracking bitumen for use as primes and fog seals or to prepare protective or waterproofing coatings to construction materials, metal castings, etc.

However, hard asphalt binders with low penetration are not abundantly available and the need for non-sticky character may adversely affect other properties such as ductility at low temperature, resistance to cracking or aging. In many cases such as in tack and prime applications, the desired non-tracking properties need only be temporary, since eventually the tack or prime is covered by an asphalt layer and is not exposed to traffic.

U.S. Pat. No. 6,025,016 relates to a binder layer composed of a primary binder film such as a tack coat, a seal coat, or a binder membrane, covered with an aqueous protective composition, which can be driven over. The aqueous protective layer can contain inorganic or organic fillers.

FR 2025771 relates to the use of aqueous dispersions containing bituminous substances and minerals that swell as spray agents for the surface treatment of bituminous traffic surfaces.

The formulation of storage-stable emulsions from hard asphalts or containing additives such as minerals and waxes designed to give non-tracking character to the residue may be technically challenging, and it is especially difficult to combine fast curing emulsion with storage stability.

DESCRIPTION OF THE INVENTION

Figure 1:
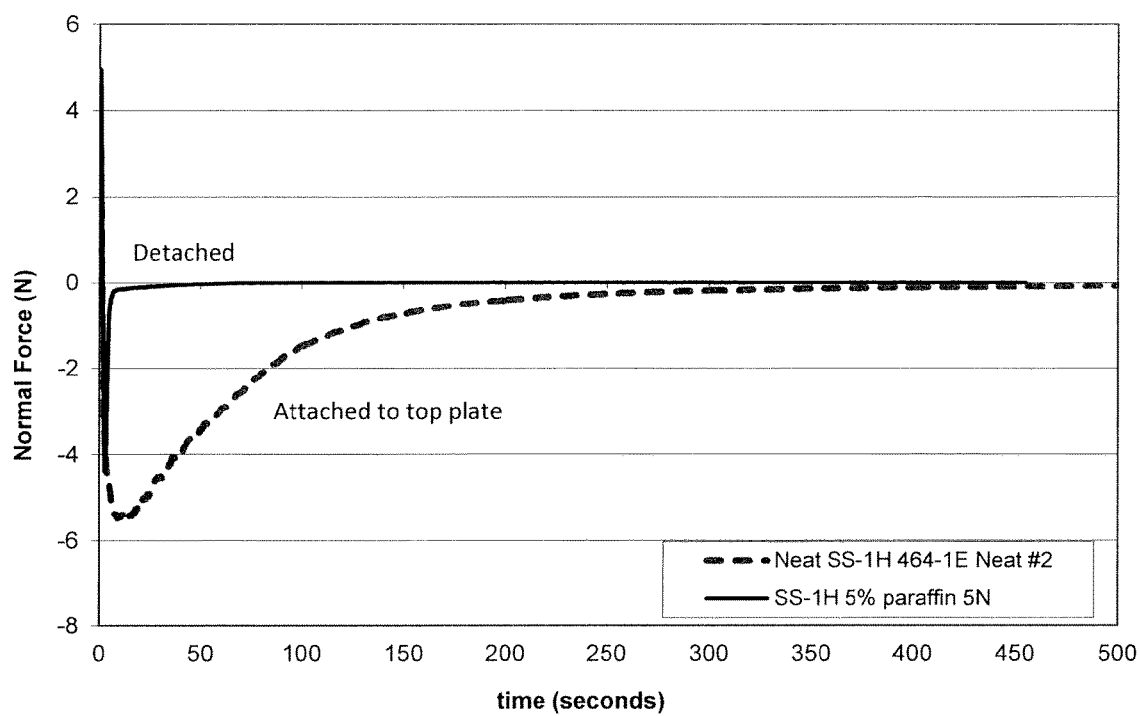
FIGS. 1 and 2 illustrate DSR tackiness measurements for SS-1H Emulsion Residues.

The method according to the present invention renders the surface of bitumen materials to be non-tacky, and minimize or eliminate the loss of the bitumen materials to traffic. The method according to the present invention may also be used on top of prime coat and fog seal, to reduce tackiness of bitumen materials from cured bitumen emulsions, and to decrease unnecessary and unwanted tracking by passing traffic.

The present invention provides a method for producing non-tacky or low-tacky coating, the coating comprises at least one bitumen based material. The method comprises the steps of first applying a layer of bitumen based material on a base substrate, and subsequently applying a separate tack-reducing material (also called a modifier) on top of the bitumen based materials. The tack-reducing material provides a non-tacky surface layer on top of the bituminous layer. The tack-reducing material may be applied by dual or triple spray application, brushing, mopping, dipping or any other technique which distributes the tack-reducing material over the bitumen surface. The tack-reducing material may be combined with other additives such as breaking agents to provide both tack reducing and break accelerating properties. It is preferred that the tack-reducing material is concentrated on the surface of the bituminous layer (i.e., with minimal/limited mixing), however some or partial mixing of the tack-reducing material and the bitumen based material may occur.

A feature of the present invention is illustrated in a tack coat application as follows. In trackless tack coat application known in the prior art, a hard asphalt binder with low penetration (penetration <40 dmm) or asphalt binder modified with polymer or hard wax to achieve similar non sticky character, or an emulsion based on these binders, is sprayed onto an asphalt or cement concrete road surface. It is generally understood that the harder the asphalt binder is (i.e., the lower the penetration), the less sticky it is. However, the supply of low penetration bitumen is limited and in some countries, it is hardly available on the local market. Further, modifiers such as Gilsonite or wax may need to be used at a high proportion of the softer bitumens (and mixed therein) in order to develop the desired non tracking effect. Furthermore, the incorporation of the modifier into the bitumen either in hot or emulsion form may present problems of compatibility; for example, some polymer latex types or mineral dispersions may not be compatible with certain emulsion chemistries and some polymer chemistry may not form stable mixtures with bitumen or may require specialized dispersion equipment.

In contrast, in the method according to the present invention, by applying the tack-reducing material (modifier) separately and with minimal/limited mixing with the bitumen based material, compatibility issues are avoided. However, even if partial or some mixing occurs while performing the method according to the present invention, such mixing of incompatible materials (e.g., negatively charged polymer dispersion with positively charged emulsion droplets) may actually be advantageous as it could accelerate the curing of the emulsion.

The tack-reducing material may be applied on the bitumen based material at any time after the application of the bitumen based material, i.e., when the bitumen based material is still uncured, partially cured, or fully cured. The bitumen based material may be applied to the base substrate in one or more applications with a total application rate of about 0.04 to about 0.91 liters per square meter, preferably about 0.23 to about 0.91 liters per square meter. The tack-reducing material at the time of application may be at a temperature of about 4° C. to about 85° C., preferably about 20° C. to about 60° C., however not exceeding about 100° C. The bitumen based material may be at any temperature when the tack-reducing material is applied, such as at a higher, or lower temperature than the temperature of the tack-reducing material.

The bitumen based material suitable for use in the method according to the present invention includes, but is not limited to, asphalt cement (including oxidized grades), tar, an emulsion of asphalt and/or tar, a cured emulsion of asphalt and/or tar, a coating comprising bitumen and/or tar, and a combination thereof. The bitumen based material may contain one or more modifiers such as polymers, ground tire rubber, adhesion promoters commonly used in bitumen technology.

The method according to the present invention allows a wide range of bitumen based material, either as hot binder or its emulsion form, to be used, even those asphalt binders that are relatively soft, such as with a penetration of more than 40 dmm. In one embodiment, the bitumen based material is a soft bitumen based material having a penetration of greater than 40 dmm. Standard "commodity" grades of bitumen materials and bitumen emulsions may be used rather than specialty non tracking materials with consequent cost savings and logistical benefits.

The base substrate may be an asphalt mix, aggregates, soil, a metal, cement concrete, wood, paper, fiber board, wall board, or a combination thereof.

In some approaches, the tack-reducing material is substantially non-reflective, does not reflect substantial luminous radiation, and/or does not cause the surface onto which the tack-reducing material is applied to appear brighter or more reflective. Substantially non-reflective means that the tack-reducing material does not reflect luminous radiation by more than 25 L* units, or by more than 20 L*, 15 L*, 10 L*, or 5 L* units, with respect to the bitumen based material to which the tack-reducing material is applied. In some aspects, the brightness is 0 L*. The brightness brought about by the tack reducing material does not exceed 25 L*, such as not exceeding 20 L*, 10 L*, or 5 L* units relative to the surface without the tack-reducing material. L* units are based on the brightness system defined by the Commission International de l'Eclairage (CIE).

Tack-reducing material which does not reflect luminous radiation, and/or does not improve brightness is desirable so as to avoid changes to the visual appearance of the surface, such as a road surface, onto which the tack-reducing material is applied. A tack-reducing material which does not reflect luminous radiation and/or does not improve brightness is also desirable to minimize glare for drivers traveling over the surface of the bitumen-based material. In bright sunlight, or even at night, glare from a reflective or a bright surface can reduce visibility of the road. In some applications, such as a fog seal, a reflective or bright surface may also interfere with the visibility of any existing markings on the bitumen-based material onto which the tack-reducing material is applied.

In other approaches, the tack-reducing material is clear, transparent, and/or not opaque, such that tack-reducing material does not interfere with the visibility of underlying traffic markings. In some aspects, the tack-reducing material has little or no impact on the underlying color or visual appearance of the surface onto which the tack reducing material is applied, such that the surface after application of the tack-reducing material remains substantially similar in color and/or brightness, or other visual appearance, to the surface before the application of the tack-reducing material, such that any shift in color or hue of the surface onto which the tack-reducing material is applied would be classified as minimal by visual inspection by the average observer.

The tack-reducing material or modifier suitable for use in the method according to the present invention includes, but is not limited to, a dispersion, emulsion or solution of an inorganic mineral, a waxy or resinous material, an organic polymer or pre-polymer, a chemical hardening agent, or a combination thereof. In one embodiment, the tack-reducing material is non-bitumen based. In another embodiment, the tack-reducing material is substantially free of bitumen based material. Substantially free of bitumen based material means that the tack-reducing material contains less than 15 wt % of bitumen based material, preferably, less than 5 wt %, 1 wt %, 0.5 wt %, 0.25 wt %, 0.1 wt % or 0.01 wt %. In yet another embodiment, the tack-reducing material is free from bitumen based material.

The inorganic minerals may be natural or synthetic clay, hydrophobic modified organoclay, talc, lime, a cementitious material, silica, or a combination thereof. The use of inorganic mineral filler as a tack reducing material is preferred in fog seal and waterproofing applications. In some approaches, the inorganic minerals may be clay, such as natural or synthetic clay, or hydrophobic modified organoclay.

The waxy material can include, but is not limited to, waxes of vegetable (e.g. carnuba wax), animal (e.g. beeswax), mineral (e.g. Montan™ wax from coal, including oxidised waxes), amide waxes (e.g. ethylene bis stearamide, stearyl amide, stearylstearamide), fatty acids and soaps of waxy nature (e.g. aluminum stearate, calcium stearate, fatty acids), other fatty materials of waxy or resinous nature (fatty alcohols, hydrogenated fats, fatty esters etc), and the like. Also, hydrocarbon waxes such as paraffin wax, polyethylene wax, polypropylene wax and Fischer Tropsch waxes, including oxidized waxes, can also be used in accordance with the invention Resinous materials include resins of vegetable (tall oil pitch, pine tar pitch, tall oil rosins, rosin acids, pine rosins, gum rosins including chemically modified resins like maleated and fumarated rosins and resinous by-products from tall oil processing or the processing of gum rosins.) or petroleum (petroleum resins, phenolic resins). In some approaches, resins having a Drop melt point greater than 60° F. (15° C.), such as greater than 60° C., and a Penetration less than 50 at 25° C. may be used. In other approaches, tall oil pitch or modified tall oil pitches containing long chain and tricyclic organic acids and sterols, are useful. The tall oil resin based modifiers may also include non-resinous fractions from distillation of crude tall oil such as fatty acids, tall oil heads, and may also include chemically modified version of these fractions as a result of maleation and fumarization.

The waxy or resinous material may be a nature-occurring or synthetic wax, an emulsion or dispersion of the nature-occurring or synthetic wax, or a combination thereof. Preferably, the waxy or resinous material is less sticky than the bitumen based material.

The organic polymer or pre-polymer may be a nature-occurring or synthetic polymer, grounded tire rubber powder, cellulose fiber, polyacrylic acid, polyacryate copolymer, natural rubber latex, styrene-butadiene rubber (SBR), styrene-butadiene-styrene (SBS), ethylene-vinyl acetate (EVA), ethylene-bis-stearamide (EBS), acrylonitrile butadiene styrene, polychloroprene, polyvinyl acetate (PVA), urea formaldehyde, phenol formaldehyde, shellac, or a combination thereof. In one embodiment, the polymer or pre-polymer is a fluorinated or silicone polymer. In another embodiment, the polymer or pre-polymer, when fully cured, is less tacky than the bitumen based material. The polymer or pre-polymer may be solubilized or stabilized in water by one or more surfactants or partially water soluble polymers, preferably hydrophobic modified polymers. In some approaches, the organic polymer or pre-polymer may be bitumen modifiers such as SBS, SBR, EVA, and EBS.

The chemical hardening agent may be a manganese salt, an iron salt, a chromium salt, or a combination thereof.

Dispersions, emulsions, or solutions of the inorganic mineral, waxy or resinous material, organic polymer or pre-polymer, and chemical hardening agent, and/or mixtures thereof may be prepared by preparing a dispersion, emulsion, or solution comprising about 1-20 wt %, such as about 1-10 wt %, about 2-10 wt %, or about 5-10 wt % of the inorganic mineral, waxy or resinous material, organic polymer or pre-polymer, and chemical hardening agent, and/or mixtures thereof, based on the weight of the dispersion, emulsion, or solution. In some approaches, the dispersion, emulsion or solution can comprise about 2-5 wt % wax, and may be a 2-5 wt % wax dispersion. In other approaches, the dispersion, emulsion or solution can comprise about 1-10 wt % of an inorganic mineral dispersion, emulsion, or solution, and may be a 1-10% inorganic mineral emulsion. The mineral emulsion may be prepared by incorporating clay slurry into a mixture to form the emulsion.

The tack-reducing material may also contain a coagulant, a wetting agent, an emulsifier, a solvent, a coalescing aid, a stabilizer, an adhesion agent, or a combination thereof, in order to simultaneously speed up curing of the emulsions, and/or enhance the adhesion or wetting to the substrate together with the tack reducing character.

By concentrating the tack-reducing material on the surface of the layer of the bitumen based material, the amount of the relatively expensive tack-reducing materials is kept to a minimum (versus when the tack-reducing material is fully mixed with the bitumen based material). Example 2 demonstrates that a much less tacky surface was obtained from a bitumen based material with penetration more than 50 PEN when a separate layer of either wax emulsion or clay slurry (i.e., tack-reducing material) was applied on top of the bitumen based material, at dosages of less than 5% basis on the bitumen based material. A further advantage is that by using a softer bitumen based material, the low temperature ductility and crack resistance of the bitumen coating can be preserved. By modifying only the very surface of the bitumen coating, the bulk properties of the bitumen based material are not affected and the properties of the bitumen coating can be tailored based on performance demands. In contrast, in the prior art which uses very hard bitumen for the bonding layer, the bonding layer maybe brittle and not suited for low temperature conditions.

Another surprising benefit of the current invention is that it has been discovered that a wider selection of the inorganic minerals, waxy or resinous materials, organic polymers or their dispersions/emulsions are effective tack reducers when applied on top of the bitumen based materials than when used to modify the bulk of the bitumen film. For example, in tack coat application, not only hard wax or its emulsion but also soft wax or its emulsion can be applied on top of the bitumen based materials to make a non-tracking or low-tracking coating. In Example 1, with the dual spray technology according the method of the present invention, a less tacky bitumen based coating was surprisingly obtained even when a wax emulsion, within which the base wax would soften and increase the penetration of asphalt binder, was applied on top of the asphalt binder.

Compared to the prior art trackless tack method using modified hard PEN binders, the dual spray technology according the method of the present invention allows a much lower amount of same wax or polymer to obtain same reduction on surface tackiness of the binder, as the modification will occur directly and only at the surface of the binders. No modification is needed to the bulk of the functional base binders.

After the separate application of the tack-reducing material on top of the bitumen based materials, these inorganic minerals, waxy or resinous materials, organic polymers or their dispersions/emulsions may be cured or become dry, and they would form a thin layer (or film) on top of the bitumen based materials, or a surface layer enriched with the modifiers. This thin layer may be continuous (e.g., uniform film) or discontinuous (e.g., patches) on the surface of the bitumen based materials. In one embodiment, the film formed as a result of application of the tack-reducing material is not readily water soluble or is water insoluble. In another embodiment, the film is thermoplastic and could melt or soften to allow good bonding to a hot-applied over-layer at high temperatures. The film could have a thickness of up to 2000 micro-meter.

The tack-reducing material may contain components which only provide the tack reducing effect when they react either with each other or in response to exposure to air or sunlight. For example, acrylic, urethane acrylic, and epoxy cure upon exposure to sunlight; meanwhile alkyd resins or drying oils cure upon exposure to air. In another embodiment the tack reducing material comprises one or more monomers or pre-polymers together with activators (or a cross-linking chemical agent) which polymerize on the surface of the bitumen based material to provide the tack reducing effect. In another embodiment, the tack reducing material is contained in capsules or porous granules which release the tack reducing agents when exposed to traffic activities.

The application of the bitumen based material, either hot-applied or in emulsion form, and the tack reducing material may be applied to the road surface with the same machine useful for road construction. The machine may include a frame with a distributor that can spray a layer of bitumen emulsion or hot bitumen binder and an applicator that can spray a second layer of the tack reducing material described herein. The machine should be capable of spraying the second tack reducing component subsequently to the first bituminous layer. The machine may include a displacement mechanism to control the application rates of the sprays.

The present invention is also directed to a layered pavement composition comprising distinct layers from bottom to top: (i) a base substrate; (ii) a bitumen based material on the surface of the base substrate; (iii) a tack reducing material on the surface of the bitumen based material; and (iv) optionally an asphalt material on the surface of the tack reducing material. The asphalt material on the surface of the tack reducing material may be different from the bitumen based material. This asphalt material may be a thick (1-10 cm) hot-applied asphalt (mix of aggregate and bitumen) which provides a structural layer or wearing course over-layer on top of the bitumen coating. In approaches where the tack-reducing material on the surface of the bitumen based material is the top-most layer which comes into contact with traffic, such as in fog seal applications, the use of inorganic mineral fillers is preferred for durability.

The present invention will now be illustrated by the following non-limiting examples.

EXAMPLES

Asphalt tackiness test by Dynamic Shear Rheometer (DSR) Surface tackiness of bitumen based materials is quantitatively measured using a DSR with standard 8 mm and 25 mm stainless steel parallel plates. A film of bitumen based materials was made with a thickness of 1000~2500 µm. Specimens of the film were cut or molded to approximate 8 mm or 25 mm diameter from prepared films of bitumen based materials. The DSR geometry for the procedure is an 8 mm or 25 mm top plate and 25 mm bottom plate. The surface tackiness of a specimen is measured by DSR through the following steps:

1. The specimen is loaded onto the lower plate at room temperature. Sample specimen is pressed lightly with gloved fingers.
2. The specimen is conditioned for 5-10 minutes @ 40-45° C. to allow complete adhesion of sample to bottom plate. The gap between the plates is set to 3000 µm.
3. The specimen is then conditioned for 15 minutes at the test temperature.
4. Then the top plate is lowered at a speed of 10 µm per second to compress and squeeze the specimen until reaching an applied force of 2~10.5 N, this is the compression step.
5. The applied force is held constant for 20-60 seconds to allow for enough contact time, this is believed to simulate a worst case of a vehicle stopped on the pavement.
6. Next, the top plate is raised upwards at a speed of 10 µm per second for up to 600 seconds or detachment of the sample from the upper plate, whichever comes first. This is the tension, pull-off step. When detachment occurs, the normal force in tension goes to zero.

In the tension step, the DSR instrument measures the normal force when the top plate is moving upwards, and generates a normal force versus time curve. The area under the curve is mathematically calculated by DSR instrument software. The curves above the x-axis show the compression steps, where the top plate is lowered at a constant rate until it touches the sample and achieves a pre-set applied force. After 20-60 seconds contact time at this specified force, the top plate is pulled in tension at a constant speed. The normal force curves produced from the tension step are displayed below the x-axis. For a tacky sample, the tension force versus time curve is broad; the force approaches zero but never reaches it because the specimen is completely adhered to the plates. The non-tacky sample has a sharp curve with a short detachment time. Examination of the plates after the test confirmed that the non-tacky sample did not adhere to the top plate and the tacky sample was firmly attached to both plates. Comparing the curves of normal force versus time, a sample with more "tack" or stickiness will have the larger area under the curve and the longer separation time than a non-tacky one.

Example 1

An SS-1 H asphalt emulsion was measured for tackiness using a TA Instruments AR2000ex DSR. The SS-1H asphalt emulsion was prepared from a PG 64-22 asphalt binder through a colloid mill using Redicote E-7000 as the emulsifier, the PG 64-22 binder has a 51.6 PEN, and softening point of 123° F./51° C. The SS-1H asphalt emulsion has a residue of about 62%.

Films were prepared from emulsion residue specimens, which were obtained by a low temperature recovery method based on ASTM D7497. The emulsion residues were prepared in silicone DSR molds; these molds are designed for asphalt binder specimen preparation for performance grading. Samples of the SS-1H asphalt emulsion are loaded by weight into the mold, and after curing, film discs of the cured asphalt emulsion residue with diameters of 19 mm are left in the mold. Then, a paraffin wax emulsion, Paramelt Syncera P1387, ~45% solids, was painted onto the cured asphalt specimens in the molds with a small brush, and allowed to cure to constant weight. The amount of wax emulsion used (on solid base) was 5% of the cured asphalt. Film discs of the asphalt with the additional layer of wax were loaded onto DSR bottom plate for surface tack measurement. Tackiness of the cured SS-1 H asphalt emulsion residue and the cured residue coated with wax emulsion were shown in FIGS. 1 &

2 and Table 1. After the 5N and 10 N tests, the neat emulsion residue was completely adhered to the DSR plates. After the 5N test, the wax coated specimen was completely detached from the upper plate, which illustrates a reduced stickiness compared to the neat emulsion residue specimen. After the 10N test, the wax coated specimen was only partially adhered to the top plate, because its surface was less sticky than the neat specimen.

A comparison of the appearance of the specimens with and without the paraffin wax indicated that the specimens with wax remained essentially black, and hence generally non-reflective.

The base wax for Paramelt Syncera P1387 wax emulsion is relatively soft, and addition of the base wax to neat PG 64-22 binder can actually increase the penetration of the modified binder. The corresponding change on penetration of the PG 64-22 asphalt binder when the binder was blended with the base wax was illustrated in Table 2. None of the tested binder or modified binders showed a penetration (PEN) lower than 40 dmm. The paraffin wax did not decrease the penetration of the asphalt base when added at 3 and 5% wax by weight.

FIG. 1 illustrates cured SS-1H Emulsion Residues, Neat and Wax coated. Tested at 5N and 25° C.

Figure 2:
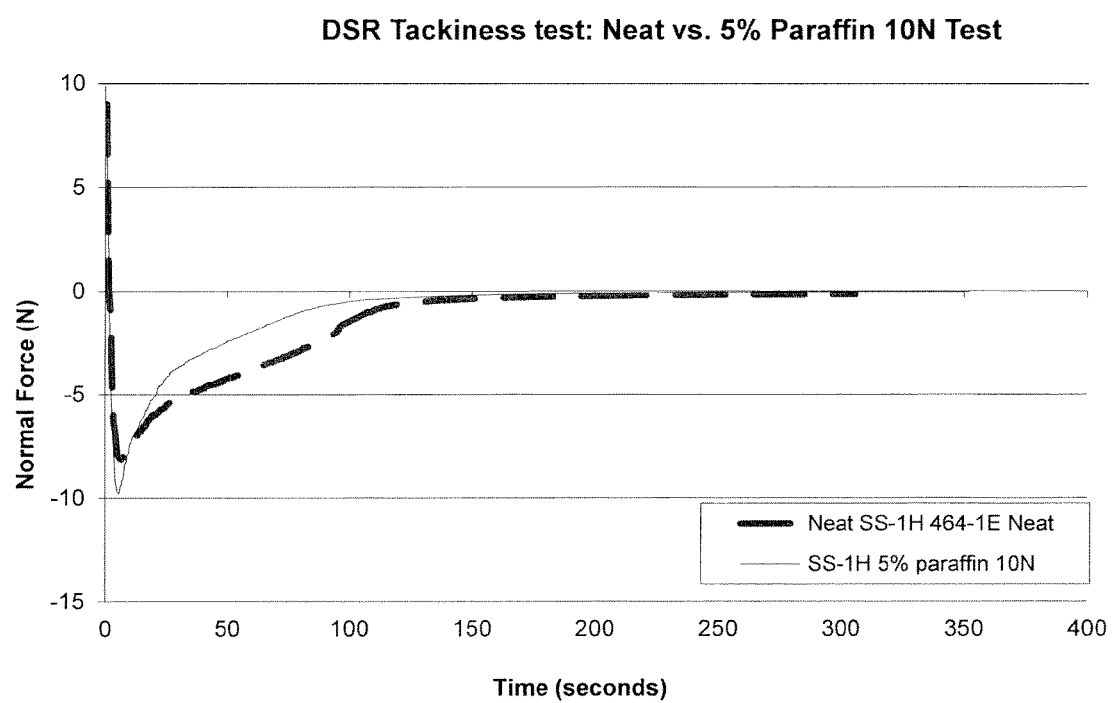

FIG. 2. illustrates cured SS-1H Emulsion Residues, Neat and Wax coated. Tested at 10N and 25° C.

thickness of the asphalt layer was estimated using a calliper. Film discs of the cured asphalt with 8 mm diameter were cut and loaded onto DSR plate for surface tack measurement, the film disc was trimmed using a razor blade before measurement. To apply a separate layer of wax emulsion, clay slurry or polymer latex, a portion of the asphalt layer was cut, placed on a small non-stick plate and weighed. Then, wax emulsion, clay slurry or polymer latex was painted onto the cured asphalt with a small brush, and allowed to cure to constant weight. The amount of wax emulsion, clay slurry or polymer latex used (on solid base) was not more than 5% of the cured asphalt. Film discs of the asphalt with the additional layer on top were cut to 8 mm diameter and loaded onto DSR plate for surface tackiness measurement, the film disc was trimmed using a razor blade before measurement. The wax emulsion used here is a modified polyethylene wax emulsion, Eka LC P60, 58% solids, from AkzoNobel. Clay slurry is a 7.5% sodium bentonite slurry, bentonite is AEG powder from American Colloid Company. Polymer latex is an aqueous styrene-acrylate copolymer dispersion (BASF Acronal NX4627x).

Figure 3:
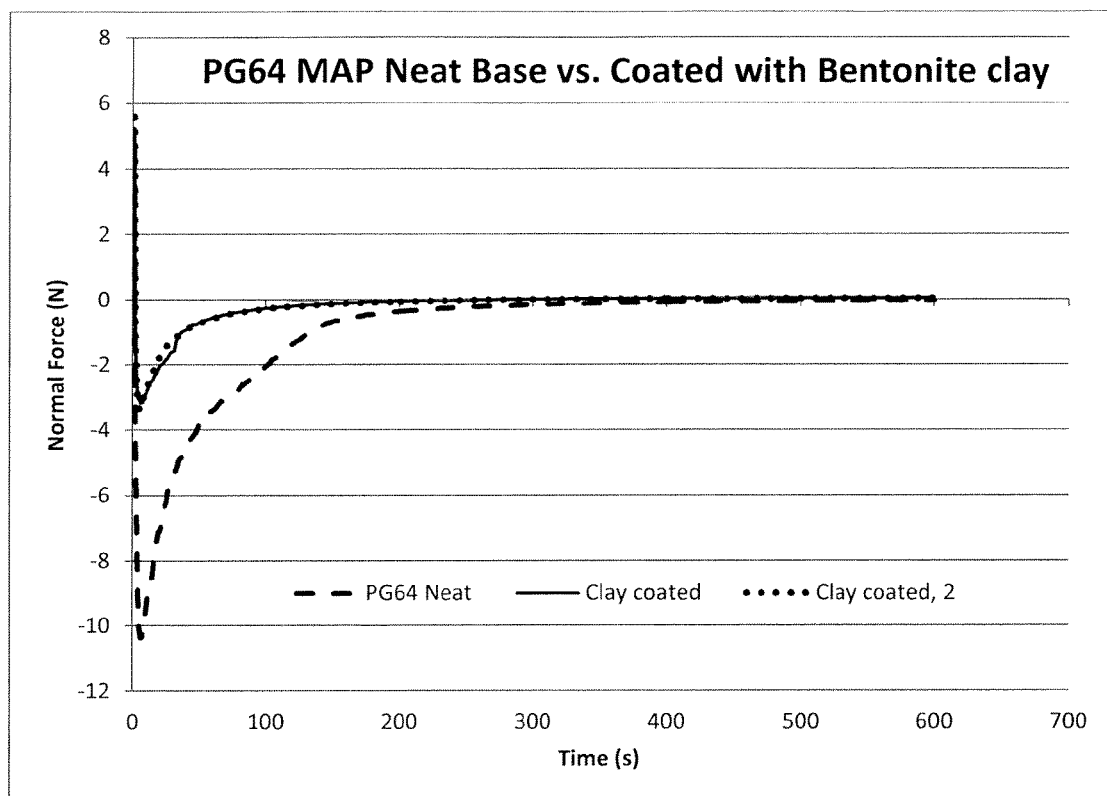
FIGS. 3 and 4 illustrate DSR tackiness measurements for PG64-22 asphalt binder.
Figure 4:
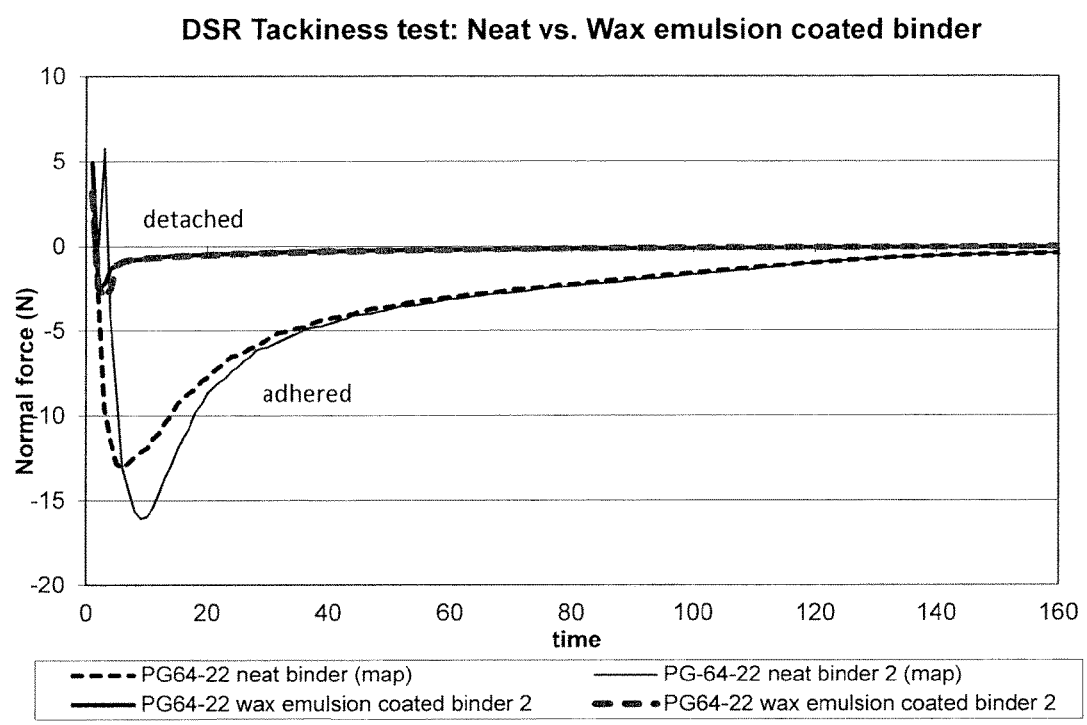

The DSR measurements on tackiness of the PG 64-22 binder and the binders coated with different additives on top are shown in FIGS. 3 & 4. FIG. 3 illustrates the DSR measurement on tackiness for PG64-22 Asphalt binder neat, and clay coated.

TABLE 1

Sample Size and Measurements from DSR Tackiness test: Neat Emulsion Residue and Paraffin wax-coated Emulsion Residues

| Sample ID | Test Force | Thickness (μm) | Max Force Pull (N) | Area Pull (Ns) | Adhesion to top plate | Detachment time, sec. |
|---|---|---|---|---|---|---|
| Neat SS-1H 464-1E | 5 N | 1599 | −5.5 | −479 | complete | NA |
| SS-1H 464-1E + 5% paraffin wax | 5 N | 1729 | −4.4 | −10.1 | detached | 10 |
| Neat SS-1H 464-1E | 10.5 N | 1410 | −8.0 | −495 | complete | NA |
| SS-1H 464-1E + 5% paraffin wax | 10.5 N | 1739 | −9.8 | −329 | partially detached | NA |

TABLE 2

Penetration of PG 64-22 binder and its blend with wax at 25° C.

| | Penetration (dmm) |
|---|---|
| Neat PG 64-22 binder | 50.9 |
| PG 64-22 + 3% wax | 58.6 |
| PG 64-22 + 5% wax | 50.9 |

This example clearly indicates that a separate spray of the paraffin wax emulsion at 5% level on top of the cured SS-1 H emulsion residue reduced the tackiness of the emulsion residue, even though blending of the base wax from the paraffin wax emulsion will not decrease the penetration of the base asphalt binder from SS-1 H emulsion at tested level.

Example 2

Surface tackiness of the same PG 64-22 asphalt binder used in example 1 and binders coated by wax emulsion, clay slurry and polymer latex were measured by TA Instruments AR2000ex DSR, using the tackiness test described above. The asphalt binder was melted and poured on a non-stick mat, the melted binder was then spread with a hot, clean spatula or rod to get relatively uniform thickness. The FIG. 4 illustrates the DSR Tackiness measurements for PG64-22 Asphalt Binder Neat and Wax Coated, 10.5N, 25° C. test. The results are also tabulated in Table 3 & 4. The results show that compared to the neat PG 64-22 asphalt binder, the clay-coated and wax-coated asphalt binders clearly exhibit surfaces of lower tackiness; they showed less adhesion to the upper plate of the DSR when tested by the DSR tackiness test.

TABLE 3

Sample Size and Measurements from DSR Tack test: Neat, clay-coated, Acronal NX4627x latex-coated

| Sample ID | Weight (g) | Thickness (μm) | Max Force Pull (N) | Area Pull (Ns) | Adhesion |
|---|---|---|---|---|---|
| Neat | 0.1007 | 2290 | −10.4 | −586 | yes |
| Clay-coated | 0.1100 | 2399 | −3.17 | −108 | yes, edges |
| Latex-coated | 0.0779 | 2369 | −3.38 | −112 | yes, edges |

TABLE 4

Sample Size and Measurements from DSR Tack test:
Neat and Wax-coated

| Sample ID | Weight (g) | Thickness (μm) | Max Force Pull (N) | Area Pull (Ns) | Adhesion |
|---|---|---|---|---|---|
| Neat | 0.0679 | 2249 | −13.0 | −550 | yes |
| Neat | 0.0688 | 2430 | −16.0 | −575 | yes |
| Wax-coated | 0.0676 | 2159 | −2.49 | −37.0 | yes, edge only |
| Wax-coated | 0.0690 | 1989 | −3.08 | −38.7 | yes, edge only |

Figure 5:
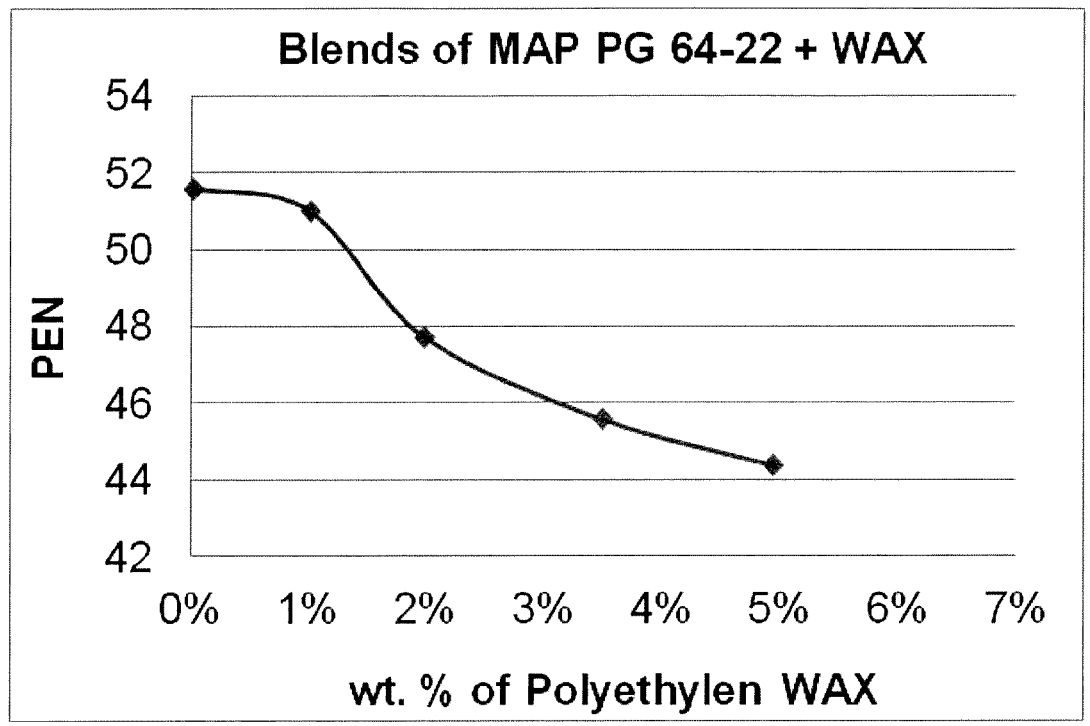
FIG. 5 illustrates penetration measurements of PG 64-22 asphalt binder and its blends with polyethylene wax at 25° C.

The corresponding change on penetration of the PG 64-22 asphalt binder when the binder was blended with the base wax for (Eka LC P60 Modified Polyethylene Wax Emulsion, 58% solids) was illustrated in FIG. 5. None of the tested binders or modified binders showed a PEN lower than 40 dmm. FIG. 5 illustrates the penetration of PG 64-22 binder and its blends with polyethylene wax at 25° C. The appearance of the asphalt binder when coated with wax, clay and polymer latex remained essentially black, and hence generally non-reflective.

Example 3

Surface tackiness of asphalt emulsion residue cured from the same SS-1 H asphalt emulsion as in example 1 and asphalt emulsion residue coated with wax emulsion were measured by TA Instruments AR2000ex DSR, using the tackiness test described above. The same wax emulsion as in example 2 was spray-applied onto an un-cured SS-1 H emulsion as follows: the SS-1 H asphalt emulsion was loaded into DSR sample molds. The wax emulsion was sprayed on top of the asphalt emulsion using a Paasche Talon TG1210 air brush. The wax emulsion was well atomized by the air brush for spraying at room temperature. The target spray coating was to apply 5% wax by weight of asphalt. The amount of wax emulsion applied was calculated by spraying the wax emulsion over a measured area for a given time, then weighing the material applied. The specimen molds containing the asphalt emulsion were covered with paper before spraying except for a hole cut out to expose the asphalt emulsion. This was done so that the specimen could be weighed and the amount of wax added could be estimated after curing. The coating of wax emulsion was sprayed with multiple passes to deposit the right amount of wax emulsion, the spray was applied 8-12 inches away from the specimens so as not to splash the liquid specimens from the molds. After coating with the sprayed wax emulsion, the paper was removed, and the samples were cured using a low temperature evaporation method, overnight at 60° C. in a forced draft oven. The cured samples were tested for tackiness on the DSR. The film discs of the asphalt with additional layer on top were removed from the sample molds and loaded onto DSR lower plate for surface tackiness measurement.

Figure 6:
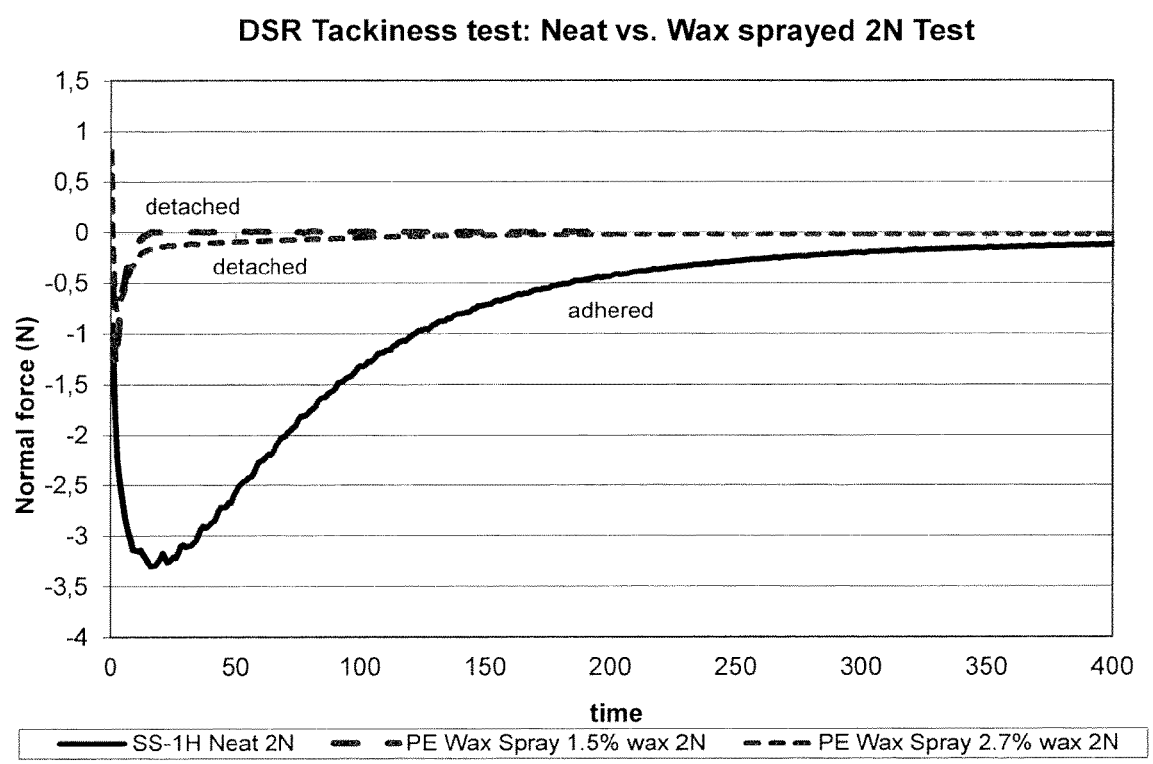
FIGS. 6 and 7 illustrate DSR tackiness measurements of SS-1H emulsion residues.
Figure 7:
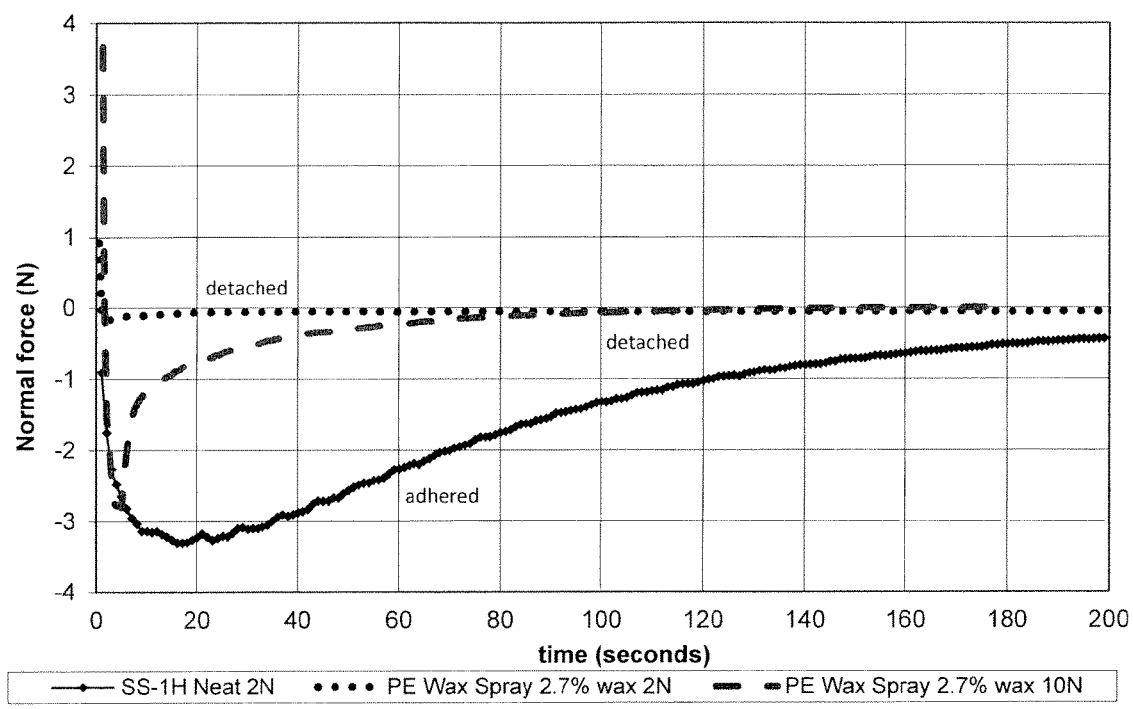

The DSR tackiness test results of the cured residue from SS-1 H asphalt emulsion and the cured emulsion residue with cured wax emulsion spray-coated on top are illustrated in FIGS. 6 and 7 and Table 5. From these results, the cured wax coated asphalt emulsion residues were less tacky than the neat asphalt residue. A spray applied wax coating of less than 5% reduced the tackiness of the emulsion residue specimens compared with the uncoated specimens.

The appearance of the asphalt emulsion residues when coated with the polyethylene wax remains essentially black, and hence generally non-reflective.

FIG. 6 illustrates DSR Tests of Emulsion Residue: SS-1H Neat and Wax Coated, 2N Test, 1.5 and 2.7% wax.

FIG. 7 illustrates DSR Tests of Emulsion Residues: SS-1H Tested at 2N versus Wax Sprayed at 2N and 10N (2.7% wax).

TABLE 5

Sample Size and Measurements from DSR Tack test: Neat and Wax-sprayed emulsion residues.

| Sample ID | Test Force | Thickness (μm) | Max Force Pull (N) | Area Pull (Ns) | Adhesion | Detachment time, sec. |
|---|---|---|---|---|---|---|
| Neat SS-1H | 2 N | 1729 | −3.3 | −376.4 | complete | NA |
| PE Wax sprayed 1.5% | 2 N | 1750 | −1.3 | −4.7 | detach | 15 |
| PE Wax sprayed 2.7% | 2 N | 1969 | −0.76 | −21.28 | detach | 90 |
| PE Wax sprayed 2.7% repeat | 2 N | 1619 | −2.8 | −44.78 | detach | 3 |
| PE Wax sprayed 2.7% | 10.5 N | 1560 | −2.8 | −34.86 | detach | 125 |

What is claimed is:

1. A method for reducing the tackiness of a bitumen coating on a base substrate, the method comprising the steps of
applying a bitumen based material on the base substrate, and
subsequently applying a tack reducing material on the surface of the bitumen based material,
wherein the tack reducing material comprises a dispersion, emulsion or solution of a component selected from the group consisting of an inorganic mineral, a waxy or resinous material, an organic polymer or pre-polymer, a chemical hardening agent, and a combination thereof;
wherein the tack-reducing material contains less than 15 wt % of bitumen based material; and
wherein the tack-reducing material is substantially non-reflective as defined by having a L* of 20 or less.

2. The method of claim 1, wherein the bitumen based material is selected from the group consisting of asphalt cement (including oxidized grades), tar, an emulsion of asphalt and/or tar, a cured emulsion of asphalt and/or tar, a coating comprising bitumen and/or tar, and a combination thereof.

3. The method of claim 1, wherein the base substrate is selected from the group consisting of an asphalt mix, aggregates, soil, a metal, cement concrete, wood, paper, fiber board, wall board, and a combination thereof.

4. The method of claim 1, wherein the inorganic mineral is selected from the group consisting of natural or synthetic clay, hydrophobic modified organoclay, talc, lime, a cementitious material, silica, and a combination thereof.

5. The method of claim 1, wherein the waxy or resinous material is selected from the group consisting of a nature-occurring or synthetic wax, an emulsion or dispersion of the nature-occurring or synthetic wax, and a combination thereof.

6. The method of claim 1, wherein the waxy or resinous material is less sticky than the bitumen based material.

7. The method of claim 1, wherein the organic polymer or pre-polymer is selected from the group consisting of a nature-occurring or synthetic polymer, grounded tire rubber powder, cellulose fiber, polyacrylic acid, polyacryate copolymer, natural rubber latex, styrene-butadiene rubber, acrylonitrile butadiene styrene, polychloroprene, polyvinyl acetate, urea formaldehyde, phenol formaldehyde, shellac, and a combination thereof.

8. The method of claim 1, wherein the polymer or pre-polymer is a fluorinated or silicone polymer.

9. The method of claim 1, wherein the chemical hardening agent is selected from the group consisting of a manganese salt, an iron salt, a chromium salt, and a combination thereof.

10. The method of claim 1, wherein the bitumen based material is partially cured when the tack reducing material is applied.

11. The method of claim 1, wherein the bitumen based material is applied to the base substrate in one or more applications with a total application rate of 0.04 to 0.91 liters per square meter.

12. The method of claim 1, wherein the tack reducing material is applied at a temperature 4° C. to 85° C.

13. The method of paving a road comprising the steps of applying a bitumen based material on the base substrate, subsequently applying a tack reducing material on the bitumen based material, and
applying an asphalt material on the tack reducing material,
wherein the tack reducing material comprises a dispersion, emulsion or solution of a component selected from the group consisting of an inorganic mineral, a waxy or resinous material, an organic polymer or pre-polymer, a chemical hardening agent, and a combination thereof,
wherein the asphalt material is bonded to the tack reducing material,
wherein the tack-reducing material contains less than 15 wt % of bitumen based material; and
wherein the tack-reducing material is substantially non-reflective as defined by having a L* of 20 or less.

14. A layered pavement composition comprising from bottom to top:
a base substrate;
a bitumen based material on the surface of the base substrate;
a tack reducing material on the surface of the bitumen based material;
and
optionally an asphalt material on the surface of the tack reducing material,
wherein the tack reducing material comprises a dispersion, emulsion or solution of a component selected from the group consisting of an inorganic mineral, a waxy or resinous material, an organic polymer or pre-polymer, a chemical hardening agent, and a combination thereof,
wherein the tack-reducing material contains less than 15 wt % of bitumen based material; and
wherein the tack-reducing material is substantially non-reflective as defined by having a L* of 20 or less.

* * * * *